United States Patent
Heiskanen et al.

(10) Patent No.: US 10,358,772 B2
(45) Date of Patent: Jul. 23, 2019

(54) MANUFACTURING METHOD FOR A FILM OR PRODUCT COMPRISING AN AMPHIPHILIC POLYMER

(71) Applicant: Stora Enso OYJ, Helsinki (FI)

(72) Inventors: Isto Heiskanen, Imatra (FI); Kaj Backfolk, Lappeenranta (FI); Esa Tapio Saukkonen, Lappeenranta (FI); Katja Eliisa Lyytikainen, Imatra (FI)

(73) Assignee: Stora Enso OYJ, Helsinki (FI)

(*) Notice: Subject to any disclaimer, the term of this patent is extended or adjusted under 35 U.S.C. 154(b) by 38 days.

(21) Appl. No.: 15/739,394

(22) PCT Filed: Jun. 21, 2016

(86) PCT No.: PCT/IB2016/053670
§ 371 (c)(1),
(2) Date: Dec. 22, 2017

(87) PCT Pub. No.: WO2016/207783
PCT Pub. Date: Dec. 29, 2016

(65) Prior Publication Data
US 2018/0355557 A1    Dec. 13, 2018

(30) Foreign Application Priority Data

Jun. 26, 2015 (SE) .................................. 1550896

(51) Int. Cl.

| | | |
|---|---|---|
| *D21H 11/18* | (2006.01) | |
| *D21H 17/28* | (2006.01) | |
| *C08L 1/02* | (2006.01) | |
| *D21H 21/56* | (2006.01) | |
| *D21H 19/34* | (2006.01) | |
| *D21H 19/54* | (2006.01) | |
| *C09D 101/02* | (2006.01) | |
| *C09D 103/02* | (2006.01) | |
| *C09D 7/40* | (2018.01) | |
| *C09D 103/04* | (2006.01) | |
| *D21H 21/06* | (2006.01) | |
| *D21H 23/28* | (2006.01) | |

(52) U.S. Cl.
CPC ............... *D21H 17/28* (2013.01); *C08L 1/02* (2013.01); *C09D 7/70* (2018.01); *C09D 101/02* (2013.01); *C09D 103/02* (2013.01); *C09D 103/04* (2013.01); *D21H 11/18* (2013.01); *D21H 19/34* (2013.01); *D21H 19/54* (2013.01); *D21H 21/06* (2013.01); *D21H 21/56* (2013.01); *D21H 23/28* (2013.01)

(58) Field of Classification Search
USPC ........................................................ 162/175
See application file for complete search history.

(56) References Cited

U.S. PATENT DOCUMENTS

| | | |
|---|---|---|
| 6,602,994 B1 | 8/2003 | Cash et al. |
| 2005/0256262 A1 | 11/2005 | Hill et al. |
| 2009/0110942 A1 | 4/2009 | Henderson-Rutgers et al. |
| 2011/0159267 A1 | 6/2011 | Ying |
| 2014/0182797 A1 | 7/2014 | Paltakari et al. |

FOREIGN PATENT DOCUMENTS

| | | |
|---|---|---|
| WO | 2004055267 A1 | 7/2004 |
| WO | 2011040547 A1 | 4/2011 |
| WO | 2013027103 A1 | 2/2013 |
| WO | 2013160553 A1 | 10/2013 |
| WO | 2013160564 A1 | 10/2013 |
| WO | 2014011112 A1 | 1/2014 |
| WO | 2014152960 A1 | 9/2014 |

OTHER PUBLICATIONS

International Search Report for PCT/IB2016-053670, dated Sep. 30, 2016.

*Primary Examiner* — Mark Halpern

(57) ABSTRACT

A method for manufacturing of a film, wherein said film is manufactured in a paper or paper board machine, wherein the method comprises the steps of providing a solution of a nanofibrillated poly-saccharide, wherein said solution comprises from 0.01 to 50 weight-% nanofibrillated polysaccharide, and wherein the nanofibrillated polysaccharide is any one of microfibrillated cellulose, nanofibrillated cellulose, nanocrystalline cellulose, microcrystalline cellulose, cellulose whiskers and cellulose derivative or a combination or mixture thereof, wherein the method further comprises the steps of providing an amphiphilic polymer; and providing a mixture of said amphiphilic polymer and said solution comprising nanofibrillated polysaccharide, whereby an intermediate solution is obtained; bringing said intermediate solution into a foam; providing said foam in the paper or board machine.

18 Claims, No Drawings

MANUFACTURING METHOD FOR A FILM OR PRODUCT COMPRISING AN AMPHIPHILIC POLYMER

This application is a U.S. National Stage under 35 U.S.C. § 371 of International Application No. PCT/IB2016/053670, filed Jun. 21, 2016, which claims priority to Swedish patent application No. 1550896-3, filed Jun. 26, 2015.

TECHNICAL FIELD

The present document relates to a method for manufacturing of paper or paper board, and products thereof, in a paper or board making process, wherein the method comprises providing a mixture of a nanofibrillated polysaccharide and an amphiphilic polymer.

BACKGROUND

In conventional foam forming in the paper industry, for instance for web forming (wet laid techniques) of paper or foam coating, foam stability may be difficult to achieve. Surface active chemicals such as sodium dodecyl sulfate (SDS) can be used to achieve the desired stability of the foam, but these types of additives have often negative effects on the end product, i.e. reduced strength, and/or risks for migration which impairs the strength or barrier properties. Also some of these surface active chemicals are unwanted as they may not be allowed in food or liquid packaging materials.

Conventional foam forming is described in GB 1 395 757 where a foamed fiber dispersion is used in the manufacturing of paper. A surface active agent is added to the fibrous pulp, to provide a dispersion with an air content of at least 65%, to be placed onto the wire of the papermaking machine. The formation of wet laid webs have also been described in the Wiggins Teaoe Radofoam process where fibers were delivered to the wire of a conventional Fourdrinier machine in a suspension in aqueous form.

In more recent years the use of microfibrillated polysaccharide, such as microfibrillated cellulose (MFC), nanocellulose or nanocrystalline cellulose (NCC) has become increasingly interesting in the paper and board making process. However, the use of MFC has some drawbacks in that the barrier layer or film that is formed has a high drying shrinkage, as well as it is prone to absorbing more water than, for example, paper made from conventional pulp. The dewatering of films or barrier coating layers made from or comprising MFC are usually quite difficult, thus needing higher energy for dewatering, and reducing the efficiency and speed of the manufacturing process.

In WO2013/160564 A1 a method in which a hydrophobically sized layer of fibrous web is formed, is disclosed, by making a foam of water, a hydrophobic size, such as alkyl ketene dimer (AKD), a surfactant, such as oxylated $C_{11}$-alcohol and microfibrillated cellulose.

There is a need for a method for forming a wet web, either by using a foam or conventional, or re-engineered wet laid techniques, which can be further dewatered and dried to a free-standing film or used as barrier coating having improved gas and aroma barrier properties at higher relative moisture content. The use of an amphiphilic starch in dispersion comprising microfibrillated fibers, offers further a barrier formulation that is substantially free from additives such as SDS.

SUMMARY

It is an object of the present disclosure, to provide an improved method for forming webs, subsequently forming a free standing film, or a coating to be applied onto paper or paperboard, either directly or as a free standing film, which eliminates or alleviates at least some of the disadvantages of the prior art foams.

The object is achieved by a method according to the appended independent claims. Embodiments are set forth in the appended dependent claims, and in the following description and drawings.

According to a first aspect, there is provided a method for manufacturing of a film, wherein said film is manufactured in a paper or paper board machine, wherein the method comprises the steps of providing a solution of a nanofibrillated polysaccharide, wherein said solution comprises from 0.01 to 50 weight-% nanofibrillated polysaccharide and wherein the nanofibrillated polysaccharide is any one of microfibrillated cellulose, nanofibrillated cellulose, cellulose whiskers and cellulose derivative or a combination or mixture thereof. The method further comprises the steps of providing an amphiphilic polymer; and providing a mixture of said amphiphilic polymer and said solution comprising nanofibrillated polysaccharide whereby an intermediate solution is obtained; bringing said intermediate solution into a foam; providing said foam in the paper or board machine.

By "amphiphilic polymer" is meant a so called surface active polymer which has both hydrophilic and hydrophobic (or lipophilic) groups.

By this method it is possible to form webs or films or coatings having excellent humidity barrier properties, or being hydrophobic, i.e. a low oxygen transmission rate, without the need to use conventional surface active chemicals, or more specifically chemicals such as tensides, which is undesirable in many applications, and for different reasons. These films may also have improved moisture vapor transmission rates (WVTR) values. Even further, these films or coatings may have increased tensile strength compared to films or coatings comprising tensides. The composition or mixture may also have excellent barrier properties for aroma and grease or other fatty substances.

By forming a foam with nanofibrillated polysaccharide and an amphiphilic polymer it is possible to produce foam for papermaking which has proven to have excellent stability and good complex forming abilities, without the need for using tensides such as SDS. The foam can thus be used for applications in which the paper or paper board is to be biodegradable or for applications where the product safety, with regards to chemical substances is a greatest importance, e.g. in food packaging. The foam can be used either for forming a web or as a coating material in the process.

The method may thus further comprise the steps of supplying the foam to a forming fabric, for forming a foam web, dewatering the foam web on the forming fabric, subjecting the foam web to drying to form a paper or paper board product, or the step of applying said foam as a coating in said paper or board making machine.

The paper or paperboard product may thus be for instance a barrier film, either free-standing or laminated, or barrier coating on a paper or paperboard, with good barrier properties, i.e. having better oxygen transmission rate properties, especially at higher relative humidity (RH) values, i.e. a RH value of above 50%. Further to this, the mixture of the amphiphilic polymer and the nanofibrillated polysaccharide has proven to have better dewatering abilities than conventional wet laid webs comprising nanofibrillated polysaccharide. This barrier film obtained by the mixture of the nanofibrillated polysaccharide and the amphiphilic polymer, may also provide other beneficial barrier properties like for instance against aroma and grease or other fatty substances.

According to one embodiment the amphiphilic polymer is selected from any one of a octenyl succinic anhydride (OSA) starch, dodecyl succinic anhydride (DDSA) starch, hydrophobic modified ethylhydroxyethyl cellulose (HM-EHEC), hydrophobic modified hydroxyethyl cellulose (HM-HEC), hydrophobic modified carboxy methyl cellulose (HM-CMC), hydrophobic modified starch (HM-starch), hydrophobic modified nanocrystalline cellulose, or a combination or mixture thereof. Also substances such as alkyl succinic anhydride (ASA) may be used.

According to another embodiment the amphiphilic polymer is a polyvinyl alcohol that contains >2% acetate groups, or more preferably more than 10% acetate groups, even more preferably >15% acetate groups.

The amphiphilic polymer may be an octenyl succinic anhydride (OSA) starch or a n-OSA starch. The surface activity of the starch is mainly provided by the OSA-group or n-OSA-group. Further the OSA starch is generally recognized as a product which is safe to use in the food and packaging industry, and which is environmentally friendly. It is also relatively cheap to use compared to other types of surface active chemicals, and can be introduced into the conventional paper making process without having to make any other modifications of the process.

According to one embodiment the OSA starch may be provided in an amount of 1 to 10% (w/w) based on (i.e. as calculated) on the amount of fibers in the solution of nanofibrillated polysaccharide. This means that a relatively large amount of an amphiphilic polymer or hydrophobically modified starch is added. By relatively large amount is also meant an amount which is not generally considered to be useful in such applications.

According to one embodiment of the first aspect the method may further comprise the step of cooking or heat treating the amphiphilic polymer in the presence of said microfibrillated polysaccharide.

Through this method it is possible to co-fibrillate for instance the OSA starch and the nanofibrillated polysaccharide, such as MFC.

The method may further comprise the step of forming said nanofibrillated polysaccharide in the presence of said amphiphilic polymer.

According to one embodiment of the first aspect, when the mixture is brought into a foam, the method may comprise providing said foam as an additive to a wet end said paper or board making machine.

The foam additive can thus be used as a strength or bulking agent in the wet end, or as a coating agent.

According to a second aspect there is paper or paper board product obtained by the method according to the first aspect.

According to the second aspect said product may be a barrier film or barrier coating having an oxygen transmission rate (OTR) of less than 20 cm³/m²/d measured at 50% relative humidity, or less than 15 cm³/m²/d measured at 50% relative humidity, or less than 10 cm³/m²/d measured at 50% relative humidity, or less than 5 cm³/m²/d measured at 50% relative humidity. The OTR value is measured at 23° C. The paper or paper board thus has a very low OTR value. The barrier may be a moisture barrier, but also an aroma, or grease barrier (i.e. fatty substances).

DESCRIPTION OF EMBODIMENTS

This invention relates to a manufacturing method, applicable in a conventional paper making or paperboard making machine or process, known to the skilled person.

According to one embodiment a solution of a nanofibrillated polysaccharide is provided.

The solution comprises the nanofibrillated polysaccharide in a range of from, 0.01 to 50 weight-%, or from 0.1 to 15 weight-%, or from 0.1 to 2.5 weight-%.

The nanofibrillated polysaccharide may be any one of microfibrillated cellulose (MFC), nanofibrillated cellulose, cellulose whiskers and cellulose derivative or a combination or mixture thereof.

The definition of nanofibrillated polysaccharide includes bacterial cellulose or nanocellulose spun with either traditional spinning techniques or with electrostatic spinning. In these cases, the material is preferably a polysaccharide but not limited to solely a polysaccharide. A polysaccharide can be e.g. starch, protein, cellulose derivatives, etc. Also microfibrillated cellulose as defined more in detail below is included in this definition. The microfibrillated cellulose (MFC) is also known as nanocellulose. It is a material typically made from wood cellulose fibers, both from hardwood or softwood fibers. It can also be made from microbial sources, agricultural fibers such as wheat straw pulp, bamboo or other non-wood fiber sources. In microfibrillated cellulose the individual microfibrils have been partly or totally detached from each other. A microfibrillated cellulose fibril is normally very thin (~20 nm) and the length is often between 100 nm to 10 μm. However, the microfibrils may also be longer, for example between 10-200 μm, but lengths even 2000 μm can be found due to wide length distribution. Fibers that has been fibrillated and which have microfibrils on the surface and microfibrils that are separated and located in a water phase of a slurry are included in the definition MFC. Furthermore, cellulose whiskers may also be included in the definition MFC. The fibrils may also be polymer coated fibrils, i.e. a modified fibril either chemically or physically.

The method according to the present invention further comprises providing a amphiphilic polymer, and then mixing the said amphiphilic polymer with the solution comprising the nanofibrillated polysaccharide. This means that a second solution comprising the nanofibrillated polysaccharide, in the amounts as stated above, the amphiphilic polymer and the remaining part water is formed. The amount of the amphiphilic polymer is chosen such that the solution comprises the nanofibrillated polysaccharide, the amphiphilic polymer, other possible additives and water up to 100%. According to one embodiment the solution of amphiphilic polymer comprises 1-100% amphiphilic polymer (w/w), more preferably 1-50%, and most preferably 1-10%.

According to one embodiment the amount of amphiphilic polymer may be in the range of from 1 to 10%, based on the amount of nanofibrillated polysaccharide, or based the amount of fibers, in a stock solution. By "amphiphilic polymer" is meant a polymer which has both hydrophilic and hydrophobic (or lipophilic) groups. The terms amphiphilic polymer and surface active polymer are both used in the present description.

The amphiphilic polymer or surface active polymer may be a so called hydrophobic surface active polymer. Among those surface active polymers useful for the present invention are for instance, ethyl hydroxyethyl cellulose (EHEC), hydrophobic modified (HM) ethylhydroxyethyl cellulose (HM-EHEC), hydroxyethyl cellulose (HEC), hydrophobic modified hydroxyethyl cellulose, HM-HEC, hydroxyproylated cellulose (HPC), hydrophobic modified carboxymethyl cellulose (HM-CMC), HM-starch, hydroxypropylated starch and so on. The amphiphilic polymer may also be any one of a octenyl succinic anhydride (OSA) starch, dodecyl succinic anhydride (DDSA) starch, carboxymethyl cellulose (CMC) having hydrophobic properties. According to one embodiment the amphiphilic polymer is an hydrophobically modified polyvinyl alcohol (PVOH), such as ethylene modified PVOH. According to yet another embodiment, the surface active polymer may be a polyvinyl alcohol containing >2% acetate groups, or more preferably more than 10% acetate groups, even more preferably >15% acetate groups.

The amphiphilic polymer may also be a charged amphiphilic polymer. The charge may facilitate the retention.

The amphiphilic polymer or surface active polymer may also be a mixture of different amphiphilic polymers or surface active polymers or derivatives of the above mentioned amphiphilic polymers or surface active polymers.

According to one embodiment the amount of OSA starch may be in the range of from 1 to 10%, based on the amount of nanofibrillated polysaccharide, or based the amount of fibers, in a stock solution.

The amphiphilic polymer may have a specific cloud temperature. The process temperature, including the drying may be performed at this specific cloud temperature, thus "activating" the polymer. Amphiphilic polymers may be activated either by a specific pH, temperature or additive. By regulating the temperature accordingly it may thus be possible to control, i.e. induce or collapse for instance foam formed by the mixture.

According to one preferred embodiment the amphiphilic polymer is OSA starch or n-OSA starch.

Through this mixture an intermediate product or solution is obtained which can then further be used in the paper or paperboard manufacturing process.

According to one embodiment the intermediate solution can be brought into foam. This can be done by any conventional means, such as mechanically, i.e. agitation, or chemically, by adding foam forming chemicals. It can also be done by adding for instance macro-, micro- or nano-bubbles of gas into the intermediate solution.

The foam may then subsequently be used in different manner in the paper making or board making process. According to one embodiment the foam may be used in a foam forming process, i.e. foam forming of a web, which web is then subsequently pressed and dried to form a sheet or film product. The sheet or film can be used as a single ply paper or as a barrier, barrier laminate or coating of, for instance, a board or other paper product.

According to another embodiment the foam may be used as a coating in the process or as a wet end additive.

According to one embodiment the process includes the fibrillation of the cellulose fibers in the presence of the amphiphilic polymer. This may facilitate the dissolution of amphiphilic polymers, since these substances may have limited or at least low solubility. Performing the fibrillation of the fibers in the presence of the amphiphilic polymer may also stabilize the fibrils formed through the fibrillation process.

According to another embodiment the amphiphilic polymer, e.g. OSA starch, is cooked or heated together with the nanofibrillated polysaccharide, e.g. a microfibrillated cellulose, prior to forming a foam or supplying the mixture in a head-box.

Through the above method it is thus possible to form a paper or paperboard product having wherein the product comprises or constitutes a sheet or film, which in turn has been formed by using the intermediate solution, i.e. mixture of nanofibrillated polysaccharide and surface active polymer as foam.

The sheet or film formed through the process may be, or be applied as, a barrier for moisture, and for aroma, or grease or other fatty substances. According to one embodiment the sheet or film said product is a barrier film or barrier coating having an oxygen transmission rate (OTR) of less than 20 $cm^3/m^2/d$ measured at 50% relative humidity, or less than 15 $cm^3/m^2/d$ measured at 50% relative humidity, or less than 10 $cm^3/m^2/d$ measured at 50% relative humidity, or less than 5 $cm^3/m^2/d$ measured at 50% relative humidity. According to one embodiment the OTR is in the range of 1 to 5 $cm^3/m^2/d$ measured at 50% relative humidity, or in the range of 2 to 4 $cm^3/m^2/d$ measured at 50% relative humidity. The OTR value is measured at 23° C.

According to one embodiment the basis weight or grammage of the paper or film formed through the process may be in the range of from 10 to 100 $g/m^2$, or in the range of from 10- to 40 $g/m^2$, or in the range of from 10, to 30 $g/m^2$, or in the range of from 10 to 25 $g/m^2$ for a base paper.

In view of the above detailed description of the present invention, other modifications and variations will become apparent to those skilled in the art. However, it should be apparent that such other modifications and variations may be effected without departing from the spirit and scope of the invention.

The invention claimed is:

1. A method for manufacturing of a film, wherein said film is manufactured in a paper or paper board machine, wherein the method comprises the steps of providing a solution of a nanofibrillated polysaccharide, wherein said solution comprises from 0.01 to 50 weight-% nanofibrillated polysaccharide, and wherein the nanofibrillated polysaccharide is any one of microfibrillated cellulose, nanofibrillated cellulose, cellulose whiskers and cellulose derivative or a combination or mixture thereof, wherein the method further comprises the steps of providing an amphiphilic polymer;

providing a mixture of said amphiphilic polymer and said solution comprising nanofibrillated polysaccharide, whereby an intermediate solution is obtained;

bringing said intermediate solution into a foam; and providing said foam in the paper or board machine.

2. The method as claimed in claim 1, wherein the method further comprises the steps of:

supplying the foam to a forming fabric, for forming a foam web;

dewatering the foam web on the forming fabric;

subjecting the foam web to drying to form a paper or paper board product.

3. The method as claimed in claim 1, wherein the method further comprises the step of applying said foam as a coating in said paper or board making machine.

4. The method as claimed in claim 1, wherein the amphiphilic polymer is selected from any one of a octenyl succinic anhydride (OSA) starch, dodecyl succinic anhydride (DDSA) starch, hydrophobic modified ethylhydroxyethyl cellulose (HM-EHEC), hydrophobic modified hydroxyethyl cellulose (HM-HEC), hydrophobic modified carboxy methyl cellulose (HM-CMC), hydrophobic modified starch (HM-starch), hydrophobic modified nanocrystalline cellulose, hydrophobically modified polyvinyl alcohol, or a combination or mixture thereof.

5. The method as claimed in claim 4, wherein the surface active polymer is octenyl succinic anhydride (OSA) starch.

6. The method as claimed in claim 5, wherein the OSA starch is provided in an amount of 1 to 10 weight-% based on the amount of fibers in the solution of nanofibrillated polysaccharide.

7. The method as claimed in claim 1, wherein the method further comprises the step of cooking the amphiphilic polymer in the presence of said microfibrillated polysaccharide.

8. The method as claimed in claim 1, wherein the method further comprises the step of forming said nanofibrillated polysaccharide in the presence of said amphiphilic polymer.

9. The method as claimed in claim 1, wherein the method comprises providing said foam as an additive to a wet end said paper or board making machine.

10. A paper or paper board product obtained by the method comprising the steps of,
    providing a solution of a nanofibrillated polysaccharide, wherein said solution comprises from 0.01 to 50 weight-% nanofibrillated polysaccharide, and wherein the nanofibrillated polysaccharide is any one of microfibrillated cellulose, nanofibrillated cellulose, cellulose whiskers and cellulose derivative or a combination or mixture thereof;
    providing an amphiphilic polymer;
    providing a mixture of said amphiphilic polymer and said solution comprising nanofibrillated polysaccharide, whereby an intermediate solution is obtained;
    bringing said intermediate solution into a foam; and
    providing said foam in the paper or board machine.

11. The paper or paper board product as claimed in claim 10, wherein said product is a barrier film or barrier coating having an oxygen transmission rate (OTR) of less than 20 cm3/m2/d measured at 50% relative humidity.

12. The paper or paper board product as claimed in claim 11, wherein the product is a base paper and wherein the base paper has a basis weight or in the range of from 10 to 100 g/m2.

13. The paper or paper board product as claimed in claim 11, wherein the product is a base paper and wherein the base paper has a basis weight or in the range of from 10 to 40 g/m2.

14. The paper or paper board product as claimed in claim 11, wherein the product is a base paper and wherein the base paper has a basis weight or in the range of from 10 to 30 g/m2.

15. The paper or paper board product as claimed in claim 11, wherein the product is a base paper and wherein the base paper has a basis weight or in the range of from 10 to 25 g/m2.

16. The paper or paper board product as claimed in claim 10, wherein said product is a barrier film or barrier coating having an oxygen transmission rate (OTR) of less than 15 cm3/m2/d measured at 50% relative humidity.

17. The paper or paper board product as claimed in claim 10, wherein said product is a barrier film or barrier coating having an oxygen transmission rate (OTR) of less than 10 cm3/m2/d measured at 50% relative humidity.

18. The paper or paper board product as claimed in claim 10, wherein said product is a barrier film or barrier coating having an oxygen transmission rate (OTR) of less than 5 cm3/m2/d measured at 50% relative humidity.

* * * * *